(12) United States Patent
Yamamoto et al.

(10) Patent No.: US 7,393,203 B2
(45) Date of Patent: Jul. 1, 2008

(54) MANDREL, METHOD OF USE THEREOF AND PRODUCTION METHOD THEREOF

(75) Inventors: Akihiro Yamamoto, Arida (JP); Masaki Ozawa, Mishima (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 261 days.

(21) Appl. No.: 11/046,787

(22) Filed: Feb. 1, 2005

(65) Prior Publication Data

US 2006/0172032 A1     Aug. 3, 2006

(51) Int. Cl.
*B28B 21/00* (2006.01)
(52) U.S. Cl. .............. 425/393; 425/403; 425/469; 106/38.2
(58) Field of Classification Search .......... 425/393, 425/403, 469; 249/183, 114.1; 106/38.2
See application file for complete search history.

(56) References Cited

U.S. PATENT DOCUMENTS 5,387,098 A * 2/1995 Willden .............. 425/393
5,958,323 A * 9/1999 Mio et al. ............ 264/402

FOREIGN PATENT DOCUMENTS

| JP | WO 9632442 | * 10/1996 |
| JP | 2000-108191 | 4/2000 |
| JP | 2000-326407 | 11/2000 |
| JP | 2000-334748 | 12/2000 |

* cited by examiner

*Primary Examiner*—Yogendra Gupta
*Assistant Examiner*—Maria Veronica D Ewald
(74) *Attorney, Agent, or Firm*—Wenderoth, Lind & Ponack, L.L.P.

(57) ABSTRACT

An object of the present invention is to provide a novel mandrel using a used mandrel, a method of use thereof and a production method thereof. The mandrel of the present invention has an inner layer formed from a thermoplastic resin composition containing an age resister and an outer layer made from a thermoplastic resin which covers the outer circumference of the inner layer. Preferably, the mandrel of the present invention is used for forming a rubber hose and preferably, the inner layer of the mandrel of the present invention is made from a thermoplastic composition obtained by pulverizing a used mandrel for forming a rubber hose.

8 Claims, No Drawings

MANDREL, METHOD OF USE THEREOF AND PRODUCTION METHOD THEREOF

FIELD OF THE INVENTION

The present invention relates to a mandrel that can be produced utilizing a mandrel unusable after repeated use due to changes in outer diameter and length, a method of use thereof and a production method thereof.

BACKGROUND OF THE INVENTION

Conventionally, rubber hose has been produced by covering a mandrel as a core with a material of a rubber hose, and pulling out the mandrel after vulcanization. A mandrel for forming a rubber hose is produced by extruding a molten thermoplastic resin from an extruder via a Long Land Die and cooling thereof. By utilizing, during such process, only an ejecting force from an extruder without using a hauler, a strain does not occur easily inside the obtained mandrel (JP-A-2000-108191). A mandrel for forming rubber hose, which is produced in this way, can be used many times. This is because such mandrel for forming rubber hose shows markedly small changes in outer diameter even when heated during production of rubber hose.

JP-A-2000-334748 discloses a mandrel made from a thermoplastic polyester elastomer containing the following components A, B and C, and also satisfying the condition D.
A: aromatic dicarboxylic acid component
B: short chain glycol component
C: polyether glycol copolymer component having a molecular weight of 500-4000 and two or more different kinds of alkylene units, which is represented by the following chemical formula:

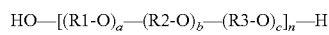

$$HO-[(R1-O)_a-(R2-O)_b-(R3-O)_c]_n-H$$

wherein
(1) R1, R2 and R3 each show an alkylene unit having 2 to 10 carbon atoms wherein R2 is different from R1 and R3, and R1 may be the same as or different from R3,
(2) a, b and c are each an integer of not less than 0 satisfying $a+b+c \geqq 2$, provided that at least two of a, b and c are not less than 1,
(3) n is an integer of not less than 2 and a number capable of achieving the molecular weight of the polyether glycol copolymer component of 500-4000.
D: thermoplastic polyelastomer contains an alkylene unit having a quaternary carbon atom, in a proportion of less than 10 wt % of the total weight of the polyether glycol component.

The mandrel made from the above-mentioned material has the water resistance, heat resistant aging property and chemical resistance same as those of conventional mandrels, and is superior in flexibility at low temperature and heat resistance and thermal cycle resistance sufficient for use at a high temperature.

However, even the aforementioned mandrel cannot be used forever, and as the number of use increases, the outer diameter changes. As a result, production of a rubber hose having a uniform thickness may be unavailable and scar may be produced in the inside of rubber hose. Generally, therefore, a mandrel used for a certain period is discarded before the above-mentioned problem occurs.

In recent years, effective utilization of resources has become a hot topic due to the penetration of recycling activity. The thermoplastic resin capable of becoming a material of mandrel needs to be positively recycled. JP-A-2000-326407 discloses a method of forming resin articles after use into a thin film, which comprises casting recovered product mainly containing thermoplastic resins in one or two extruders and extrusion forming the resin using two or more dies into a sheet. The aforementioned method effectively uses resources and achieves recycling. However, reuse, such as reusing a mandrel as a mandrel has not been achieved. Examples of reuse include fractional recovery of copper wire and aluminum wire from used electric cable, mixing with a new material, performing sequential molding to produce a wire rod for use again as an electric cable and the like. However, an example of reuse of a mandrel for forming a rubber hose has not been known.

SUMMARY OF THE INVENTION

For reuse of a used mandrel for forming a rubber hose, a method comprising pulverizing the mandrel to give a thermoplastic resin composition and forming the thermoplastic resin composition into a mandrel can be mentioned. However, contaminants are mixed in the pulverization step and exposed on the surface of mandrel after forming. When a rubber hose is produced using such mandrel, contaminants appearing on the surface of the mandrel may damage the inside of rubber hose or may be contained in the rubber hose, thus making a high quality rubber hose difficult to obtain.

It is therefore an object of the present invention to provide a novel mandrel, a method of use thereof and a production method thereof, which utilize used mandrel.

The present inventors have conducted intensive studies results in an attempt to solve the above-mentioned, which resulted in the completion of the present invention.

Accordingly, the present invention includes the following.
[1] A mandrel comprising an inner layer formed from a thermoplastic resin composition comprising an age resister, and an outer layer formed from a thermoplastic resin composition covering the outer circumference of the inner layer,
[2] the mandrel of [1], wherein the age resister comprises a compound having a phenyl group,
[3] the mandrel of [1] or [2], wherein the outer layer is formed from a thermoplastic resin composition substantially free of an age resister having a phenyl group,
[4] the mandrel of any of [1] to [3], having an outer diameter of 15 mm or above,
[5] the mandrel of any of [1] to [4], wherein the inner layer is formed from a thermoplastic resin composition obtained by pulverizing a used mandrel for forming a rubber hose,
[6] a method of using a mandrel for forming a rubber hose, which comprises applying a material for rubber hose to the outer circumference of the mandrel of any of [1] to [5],
[7] a production method of a mandrel comprising at least two layers, which comprises forming an inner layer by extrusion forming a thermoplastic resin composition obtained by pulverizing a used mandrel for forming a rubber hose, and forming an outer layer by extrusion forming a thermoplastic resin composition on the outer circumference of the inner layer, and
[8] the production method of [7], wherein the thermoplastic resin composition for forming the outer layer is substantially free of an age resister having a phenyl group.

DETAILED DESCRIPTION OF THE INVENTION

The present invention is explained in detail in the following.

The mandrel of the present invention has an inner layer and an outer layer covering the outer circumference of the inner layer, wherein the inner layer is formed from a thermoplastic resin composition containing an age resister, and the outer layer is formed from a thermoplastic resin composition. The mandrel of the present invention is preferably used as a core for forming a hollow molded product. The mandrel of the present invention is a solid or a hollow rod-like product, wherein the cross sectional shape perpendicular to the longitudinal direction thereof is not particularly limited. For example, it may be a circle (perfect circle, ellipse), quadrate (rectangle, square), triangle, polygon and the like, and generally a circle. The mandrel of the present invention may have a multi-layer structure comprising an inner layer, an outer layer to cover the inner layer, and further, an innermost layer to be formed on the inside of the inner layer, an outermost layer to be formed on the outside of the outer layer, or an intermediate layer to be formed between the inner layer and the outer layer and the like. From the aspects of easy production, cost and the like, a mandrel preferably consists of two layers of an inner layer, and an outer layer to directly cover the outer circumference of the inner layer.

In the mandrel of the present invention, the thermoplastic resin composition forming the inner layer contains an age resister, and the thermoplastic resin composition forming the outer layer is preferably substantially free of an age resister having a phenyl group. Conventionally, an age resister is not added to a mandrel. This is because a mandrel does not need an age resister. An age resister is added to suppress the attack of oxygen ($O_2$) on a double bond present in a rubber hose (rubber material).

Since an age resister binds to $O_2$ in advance, the double bond is protected. However, since the mandrel contains a thermoplastic resin (e.g. TPX® which is a poly(4-methylpentene-1) manufactured by Mitsui Chemicals Inc.) free of double bond, an age resister does not need to be added.

In the mandrel of the present invention, since an inner layer, which does not directly contact a material of a hollow molded product being formed, contains an age resister, the above-mentioned inconvenience does not occur. In consideration of easy reeling and the like, a mandrel having a large diameter (outer diameter of not less than 15 mm) is particularly preferably formed from a soft material in the entirety. From such aspects, it is a general conventional practice to add a material to a plasticizer for forming a mandrel. To achieve a desired flexibility, for example, a Shore D hardness of 50-60 measured according to ASTM D2240, an excess amount of a plasticizer needs to be added. Therefore, it sometimes happened that the plasticizer bled out on the surface of a mandrel, the plasticizer vaporized by the heat used for forming the hollow molded product and pinholes were formed in the obtained hollow molded product. In the mandrel of the present invention, since the inner layer contains an age resister, to achieve the flexibility of a mandrel, an excess amount of plasticizer is not necessary and the above-mentioned inconvenience does not occur. Preferably, the above-mentioned Shore D hardness of the inner layer of the mandrel of the present invention is 50-60 and the above-mentioned Shore D hardness of the outer layer exceeds 60 and not more than 70.

As the age resister to be contained in the inner layer, age resisters generally added to rubber molded product and resin molded product can be mentioned without particular limitation. The age resister preferably contains a compound having a phenyl group. As the age resister, for example, monophenol age resisters (specifically, 1-oxy-3-methyl-4-isopropylbenzene, 2,6-di-tert-butylphenol, 2,6-di-tert-butyl-4-ethylphenol, 2,6-di-tert-butyl-4-methylphenol, 2,6-di-tert-butyl-4-sec-butylphenol, butyl hydroxyanisole, 2-(1-methylcyclohexyl)-4,6-dimethylphenol, 2,6-di-tert-butyl-α-dimethylamino-p-cresol and the like), bis, tris, polyphenol age resisters (specifically, 2,2'-methylene-bis(4-methyl-6-tert-butylphenol), 2,2-methylene-bis(4-methyl-6-cyclohexyl phenol), 2,2'-methylene-bis(4-ethyl-6-tert-butylphenol), 4,4'-methylene-bis(2,6-di-tert-butylphenol), 2,2'-methylene-bis(6-α-methyl-benzyl-p-cresol), 4,4'-butylidene-bis(6-tert-butyl-m-cresol), 2,2'-ethylidene-bis(4,6-di-tert-butylphenol), 1,1-bis(4-hydroxyphenyl)-cyclohexane, 2,2'-dihydroxy-3,3'-di-(α-methylcyclohexyl)-5,5'-dimethyl diphenylmethane, alkylated bisphenol, 1,3,5-trimethyl-2,4,6-tris(3,5-di-tert-4-hydroxybenzyl)benzene, 1,3,5-tris(4-tert-butyl-3-hydroxy-2,6-dimethylbenzyl)isocyanurate, 2-tert-butyl-6-(3'-tert-butyl-5'-methyl-2'-hydroxybenzyl)-4-methylphenyl•acrylate, 3,9-bis[2-[3-(3-tert-butyl-4-hydroxy-5-methylphenyl)propionyloxy]-1,1-dimethylethyl]-2,4-8,10-tetraoxaspiro[5,5]undecane and the like), thiobisphenol age resisters (specifically, 4,4'-thiobis(6-tert-butyl-3-methylphenol), 4,4'-thiobis(6-tert-butyl-o-cresol), bis(3,5-di-tert-butyl-4-hydroxybenzyl)sulfide and the like), hindered phenol age resisters (specifically, 1,1,3-tris(2-methyl-4-hydroxy-5-tert-butylphenyl)butane, 4,4'-butylidenebis(3-methyl-6-tert-butylphenol), 2,2-thiobis(4-methyl-6-tert-6-butylphenol), n-octadecyl-3-(4'-hydroxy-3',5'-di-tert-butyl•phenyl)propionate, tetrakis-[methylene-3-(3', 5'-di-tert-butyl-4'-hydroxyphenylpropionate)methane, triethyleneglycol-bis[3-(3-tert-butyl-5-methyl-4-hydroxyphenyl)propionate], 6-(4-hydroxy-3,5-di-tert-butyl anilino)-2,4-bis•octyl-thio-1,3,5-triazine, tris-(3,5-di-tert-butyl-4-hydroxybenzyl)-isocyanurate, 3,5-di-tert-butyl-4-hydroxybenzyl-phosphonate-diethylester and the like] can be mentioned. Of these, n-octadecyl-3-(4'-hydroxy-3',5'-di-tert-butyl vb•phenyl)propionate is preferably used.

The content of the age resister in the inner layer is not particularly limited, and is preferably 0.1-5 wt %, more preferably 0.5-3.5 wt %. When the age resister is less than 0.1 wt %, the flexibility tends to be insufficient, and when it exceeds 5 wt %, the mandrel becomes too soft and easily deformed when it is pulled out from a produced rubber hose.

The thermoplastic resin with which to form an inner layer and an outer layer is not particularly limited, and, for example, poly 4-methyl-1-pentene, polyamide, polyester, polypropylene, polyacetal, polyphenylene ether, polyphenylene sulfide and the like can be mentioned. The thermoplastic resin may be one kind selected from the above-mentioned examples or a mixture of two or more kinds thereof. In the present invention, moreover, the thermoplastic resin with which to form an inner layer and an outer layer may be the same or different for both the inner layer and the outer layer. Of the above-mentioned materials, both the inner layer and the outer layer are preferably formed from poly 4-methyl-1-pentene, in view of the chemical resistance, hydrolysis stability, heat resistance and flexibility.

The mandrel of the present invention can be preferably used as a core in forming a hollow molded product. The hollow molded product is not particularly limited, and the mandrel of the present invention is particularly preferable for forming a rubber hose. A method using the mandrel of the present invention for forming a rubber hose essentially comprises covering the outer circumference of the mandrel with a material for rubber hose. Generally, after vulcanization of the material for rubber hose, the mandrel is pulled out to give a rubber hose. The material for rubber hose is conventionally known and is not particularly limited.

In a preferable embodiment of the present invention, the inner layer of a mandrel is preferably formed using, as a forming material, a used mandrel for forming a rubber hose. In the following of the present specification, when an inner layer is formed using a used mandrel for forming a rubber hose as a forming material, this forming material is sometimes referred to as a "recycled material". As used herein, by the "used" is meant being used not less than once and generally refers to many times of use. However, use of a mandrel, which is free of variation of the outer diameter to the extent that a rubber hose having a uniform thickness cannot be produced or the inside of a rubber hose is damaged, as a recycled material is preferable. By forming an inner layer using such recycled material, a new mandrel can be produced using a used mandrel as a material, thus realizing reuse. It is possible to produce a mandrel having an inner layer containing an age resister by forming an inner layer with a recycled material, without further addition of an age resister. To be precise, when a mandrel is used many times for forming a rubber hose, an age resister from the additives contained in the rubber composition, which is a material of a rubber hose, is transferred to the mandrel. Thus, the thermoplastic resin composition obtained by pulverizing a used mandrel contains an age resister derived from a rubber composition. Therefore, an inner layer comprising the thermoplastic resin composition obtained by pulverizing a used mandrel contains an age resister contained in a rubber composition, which is a material of a rubber hose. The present inventors have confirmed the aforementioned by measuring the components extracted with methanol from a used mandrel for forming a rubber hose and unused mandrel for forming a rubber hose with an infrared spectrophotometer (hereinafter to be "IR") and compared the difference of the obtained peaks. In other words, the both IR peaks were compared, IR peaks confirmed only in the used mandrel were identified, and compared with the IR peaks of the materials of the rubber composition and additive. As a result, the IR peak confirmed only in the used mandrel was confirmed to be derived from an age resister having a phenyl group. Moreover, the present inventors measured the amount of an age resister contained in the used mandrel by liquid chromatographic analysis (detection limit; 0.1 wt %). As a result, the used mandrel contained 0.5 wt % (n=5) of an age resister. Thus, using a used mandrel for forming a rubber hose, a mandrel having an inner layer containing an age resister can be produced without further addition of an age resister.

The mandrel of the present invention preferably comprises at least an inner layer formed from the above-mentioned recycled material, in other words, an inner layer formed from a thermoplastic resin composition containing an age resister, and an outer layer to cover the outer circumference of the inner layer, which is formed from a thermoplastic resin composition, and more preferably, a new thermoplastic resin is used for the outer layer. As used herein, a new thermoplastic resin may be an unused commercially available thermoplastic resin, which generally does not substantially contain an age resister having a phenyl group. A mandrel having a single layer, which is formed using only a recycled material, is feared to damage the inside of a rubber hose due to the contamination that appears on the surface when forming a rubber hose. However, the mandrel of the present invention is free of such incidence. To prevent the damage of the inside of a rubber hose, a mandrel having a single layer structure may be formed by melting a recycled material, filtering the material many times to remove contamination, and using the resulting recycled material. However, such mandrel is inferior in productivity and cost. Since the mandrel of the present invention has at least an inner layer formed from a recycled material and an outer layer formed from a new material to cover this inner layer, it is advantageous from the aspects of productivity and cost, and is reusable.

As mentioned above, the mandrel of the present invention may have a multi-layer structure comprising an inner layer, an outer layer, and further, an innermost layer to be formed on the inside of the inner layer, an outermost layer to be formed on the outside of the outer layer, or an intermediate layer to be formed between the inner layer and the outer layer and the like. When the inner layer is formed from a recycled material and the outer layer is formed from a new material, the outer layer is preferably formed to constitute the outermost layer of the mandrel, and a two-layer structure of inner layer and outer layer is particularly preferable.

The size of the mandrel of the present invention is free of any particular limitation. A mandrel having a two-layer structure of an inner layer formed from a recycled material and an outer layer formed from a new material preferably has an outer diameter of not less than 15 mm, more preferably not less than 18 mm. The upper limit of the outer diameter of the mandrel of the present invention is not particularly limited, but is generally about 30 mm. Here, the outer diameter in the present specification refers to the maximum distance between two points measured in any direction of a cross section perpendicular to the longitudinal direction of the mandrel, irrespective of the cross sectional shape. A mandrel having the above-mentioned two-layer structure preferably has a largest possible outer diameter. This is because the entire cost of the mandrel can be drastically reduced by the use of a largest possible amount of a recycled material having a low cost. For the similar reasons, the outer layer of the mandrel of the present invention is preferably as thin as possible, because a large amount of a recycled material can be used. Production of a mandrel having too thin an outer layer is difficult and the effect of the contamination in the inner layer shows easily. Therefore, the thickness of the outer layer is preferably of a level that does not cause damage on the inside of a rubber hose when in use, which can be appropriately determined according to the outer diameter of the whole mandrel. Specifically, the thickness of the outer layer is preferably 0.5-1.5 mm.

The mandrel of the present invention can be produced by a method conventionally known, and the steps, conditions and the like of the production are not particularly limited. For example, when a mandrel having a two-layer structure of an inner layer formed from a recycled material and an outer layer formed from a new material is to be produced, a used mandrel for forming a rubber hose is pulverized by a known method, the obtained thermoplastic resin composition is extrusion formed and a new thermoplastic resin composition is extrusion formed on the outer circumference to give a mandrel. From the aspect of efficient production, extrusion forming of the inner layer and the outer layer is desirably performed simultaneously. To be specific, it can be produced by using a two-layer extruder equipped with a Long Land Dies applying the technique described in JP-A-2000-108191.

The material for forming the mandrel of the present invention can contain various known additives as necessary such as crosslinking agents, crosslinking additives, stabilizers, lubricants, fillers, plasticizers and the like, to the extent that the effect of the present invention is not impaired. The amount of these additives to be used can be appropriately determined according to the object of addition and is not particularly limited. However, the outer layer is preferably substantially made from a thermoplastic resin, and preferably not less than 80 wt % of the outer layer is made from a thermoplastic resin.

EXAMPLES

The present invention is explained in detail by referring to examples, which are not to be construed as limitative.

Example 1

A thermoplastic resin composition was obtained by pulverizing a mandrel used many times for forming rubber hose. This thermoplastic resin composition contained poly 4-methyl-1-pentene as a main component and 1.0 wt % of an age resister (n-octadecyl-3-(4'-hydroxy-3',5'-di-tert-butyl phenyl)propionate). A mandrel having a two-layer structure and an outer diameter of 16 mm was produced from this thermoplastic resin composition as a material for an inner layer and commercially available poly 4-methyl-1-pentene as a material for an outer layer, by extrusion forming using a two-layer extruder equipped with a Long Land Dies. The cross section of the inner layer of this mandrel was a perfect circle having an outer diameter of 14 mm.

Comparative Example 1

A mandrel having a single layer and a diameter of 16 mm was produced from commercially available poly 4-methyl-1-pentene alone.

Comparative Example 2

A mandrel having a single layer and a diameter of 16 mm was produced from a thermoplastic resin composition alone, which was the same as the material used for the inner layer in Example 1.

[Comparative Test]

The mandrels prepared in Example 1, Comparative Example 1 and Comparative Example 2 were measured for Shore D hardness according to ASTM D2240. The Shore D hardness of each mandrel was as follows. Example 1 (inner layer: 54, outer layer: 64), Comparative Example 1 (64), Comparative Example 2 (54).

Using the above-mentioned mandrels, rubber hoses were produced. When the mandrel of Example 1 was used, a rubber hose could be produced with fine workability and the inner circumference of the obtained rubber hose was free of concaves, convexes and contamination. Since the mandrel of Comparative Example 1 was poor in flexibility, the workability during reeling a rubber hose was degraded. When the mandrel of Comparative Example 2 was used, concaves and convexes due to contamination and contamination itself were observed on the inner circumference of the obtained rubber hose.

According to the present invention, a new mandrel can be produced from a used mandrel. Since this mandrel is free of contamination on the surface, a rubber hose formed using this mandrel shows suppressed damages on the inside and less contamination. Even when a plasticizer is not added as excessively as in conventional production, the mandrel of the present invention has flexibility. Thus, a hollow molded product formed using this mandrel resists occurrence of pinholes. Therefore, the present invention can provide a mandrel having higher flexibility as compared to conventional mandrels.

What is claimed is:

1. A mandrel comprising an inner layer formed from a thermoplastic resin composition comprising an age resister, and an outer layer formed from a thermoplastic resin composition substantially free of an age resister having a phenyl group and covering the outer circumference of the inner layer, wherein the inner layer has a Shore D hardness of 50-60 and the outer layer has a Shore D hardness of more than 60 and not more than 70.

2. The mandrel of claim 1, wherein the age resister comprises a compound having a phenyl group.

3. The mandrel of claim 1, having an outer diameter of 15 mm or above.

4. The mandrel of claim 1, wherein the inner layer is formed from a thermoplastic resin composition obtained by pulverizing a used mandrel for forming a rubber hose.

5. A method of using a mandrel for forming a rubber hose, which comprises applying a material for rubber hose to the outer circumference of the mandrel of claim 1.

6. A production method of the mandrel of claim 1 comprising at least two layers, which comprises forming an inner layer by extrusion forming a thermoplastic resin composition obtained by pulverizing a used mandrel for forming a rubber hose, and forming an outer layer by extrusion forming a thermoplastic resin composition on the outer circumference of the inner layer.

7. The mandrel of claim 1, which comprises a thermoplastic resin free of a double bond.

8. The mandrel of claim 1, which comprises TPX®.

* * * * *